United States Patent [19]

Divan

[11] Patent Number: 4,730,242
[45] Date of Patent: Mar. 8, 1988

[54] STATIC POWER CONVERSION AND APPARATUS HAVING ESSENTIALLY ZERO SWITCHING LOSSES

[75] Inventor: Deepakraj M. Divan, Madison, Wis.
[73] Assignee: Wisconsin Alumni Research Foundation, Madison, Wis.
[21] Appl. No.: 912,080
[22] Filed: Sep. 25, 1986
[51] Int. Cl.$^4$ .................. H02M 5/458; H02M 7/162; H02M 7/5387
[52] U.S. Cl. ..................................... 363/37; 363/127; 363/132
[58] Field of Search ................... 323/222; 363/37, 40, 363/79, 131, 132, 163, 129, 127; 318/762, 803

[56] References Cited

U.S. PATENT DOCUMENTS

| | | | |
|---|---|---|---|
| 3,213,287 | 10/1965 | King | 363/137 |
| 3,222,587 | 12/1965 | Lichowsky | 363/37 |
| 3,247,444 | 4/1966 | Clarke et al. | 363/36 |
| 3,430,123 | 2/1969 | Corry et al. | 363/37 |
| 3,678,367 | 7/1972 | McMurray | |
| 3,699,425 | 10/1972 | Hermansson et al. | |
| 3,742,336 | 6/1973 | Bedford | |
| 3,858,105 | 12/1974 | Gyugyl | |
| 3,875,494 | 4/1975 | Gyugyl | 307/82 |
| 3,940,669 | 2/1976 | Tsuboi et al. | 363/137 |
| 3,953,779 | 4/1976 | Schwartz | |
| 4,005,350 | 1/1977 | Brenneisen | 363/58 |
| 4,013,937 | 3/1977 | Pelly et al. | |
| 4,086,622 | 4/1978 | Vukasovic | 363/136 |
| 4,099,225 | 7/1978 | Nygaard | 363/56 |
| 4,196,468 | 4/1980 | Shapiro et al. | 363/136 |
| 4,196,469 | 4/1980 | Gurwicz | 363/131 |
| 4,227,243 | 10/1980 | Gurwicz et al. | 363/132 |
| 4,310,866 | 1/1982 | Wirth | 363/132 |
| 4,333,134 | 6/1982 | Gurwicz | 363/132 |
| 4,358,654 | 11/1982 | Estes | 363/97 |
| 4,413,313 | 11/1983 | Robinson | 363/131 |
| 4,523,269 | 6/1985 | Baker et al. | 363/138 |
| 4,541,041 | 9/1985 | Park et al. | 363/132 |

FOREIGN PATENT DOCUMENTS

| | | | |
|---|---|---|---|
| 2541687 | 3/1977 | Fed. Rep. of Germany | 363/36 |
| 59478 | 4/1982 | Japan | 363/36 |
| 118069 | 6/1985 | Japan | 323/222 |
| 463211 | 8/1975 | U.S.S.R. | 363/40 |

OTHER PUBLICATIONS

Steigerwald, "High-Frequency Resonant Transistor DC-DC Converter", IEEE Trans. on Ind. Elect., vol. 1E-31, No. 2, pp. 181-191, May 1984.
Schwarz, "A Doublesided Cycloconverter", IEEE Trans. on Ind. Elect. and Control Inst., vol. IECI-28, No. 4, pp. 282-291, Nov. 1981.
Schwarz et al., "A Multikilowatt Polyphase AC/DC Converter with Rev. Power Flow and without Passive Low-Freq. Filters", IEEE Trans. on Ind. Elect. and Control Inst., vol. IECI-28, No. 4, pp. 273-281, Nov. 1981.
Gyugyi et al., "The High Freq. Base Converter—A New Approach to Static High-Power Conversion", IEEE Trans. on Ind. Applications, vol. 1A-15, No. 4, pp. 420-429, Jul./Aug. 1979.

Primary Examiner—William H. Beha, Jr.
Attorney, Agent, or Firm—Isaksen, Lathrop, Esch, Hart & Clark

[57] ABSTRACT

A high efficiency power converter is achieved utilizing a resonant DC link between a DC source, such as a converter rectifying power from an AC power system, to a variable frequency voltage source inverter. A resonant circuit composed of an inductor and capacitor is connected to the DC power supply and to a DC bus supplying the inverter and is caused to oscillate stably at a high frequency to provide a uni-directional voltage across the DC bus which reaches zero volts during each cycle of oscillation of the resonant circuit. The switching devices of the inverter are controlled to switch on and off only at times when the DC bus voltage is zero, thereby eliminating switching losses in the inverter. The resonant circuit can be caused to oscillate utilizing pairs of switching devices in the inverter or a separate switching device across the capacitor, which again are caused to switch on and off only at times of zero voltage on the DC bus. For AC to AC conversion, enabling bi-directional power flow, the switching devices of the power source which converts AC power to DC power may have switching devices which are also switched only at the times of zero voltage so that switching losses in these devices is also minimized.

25 Claims, 11 Drawing Figures

STATIC POWER CONVERSION AND APPARATUS HAVING ESSENTIALLY ZERO SWITCHING LOSSES

TECHNICAL FIELD

This invention pertains generally to the field of static power converters and systems for the control of static power converters.

BACKGROUND OF THE INVENTION

The development and commercial availability of gate turn-off devices capable of handling relatively large power levels has resulted in a significant change in power conversion technology. For example, thyristors are now rarely used in force-commutated systems. To a large extent, the thyristor current source inverter has been replaced by GTO and transistor voltage source inverters at power ratings up to 1 megawatt (MW). The voltage source inverter is particularly attractive because of its extremely simple power structure and the need for only six uni-directional gate turn-off devices (for three-phase load power). The anti-parallel diodes required across each of the gate turn-off devices are typically provided by the manufacturer in the same device package for minimum lead inductance and ease of assembly. The control strategy for such voltage source inverters is reasonably simple and provides a fully regenerative interface between the DC source and the AC load.

Despite the clear advantages of the voltage source inverter structure, the inherent characteristics of available gate turn-off devices imposes several limitations on the performance of the inverters. For example, the high switching losses encountered in such inverters mandates the use of low switching frequencies, resulting in low amplifier bandwidth and poor load current waveform fidelity (unwanted harmonics). The rapid change of voltage with time on the output of the inverter generates interference due to capacitive coupling. The parallel diode reverse recovery and snubber interactions cause high device stresses under regeneration conditions. In turn, the need to withstand the high device stresses reduces reliability and requires that the devices be overspecified. The relatively low switching frequencies required has also been observed to cause an acoustic noise problem because the switching frequency harmonics in the output power generate noise at audible frequencies in the switching system and motor. And, in general, present inverter designs have poor regeneration capability into the AC supply line, poor AC input line harmonics, requiring large DC link and AC side filters, and have poor fault recovery characteristics.

Ideally, a power converter should have essentially zero switching losses, a switching frequency greater than about 18 kHz (above the audible range), small reactive components and the ability to transfer power bi-directionally. The system should also be insensitive to second order parameters such as diode recovery times, device turn-off characteristics and parasitic reactive elements. It is clear that present voltage source inverter designs do not achieve such optimum converter characteristics.

It is apparent that a substantial increase in inverter switching frequency would be desirable to minimize the lower order harmonics in pulse width modulated inverters. Higher switching frequencies have the accompanying advantages of higher current regulator bandwidth, smaller reactive component size and, for frequencies above 18 kHz, acoustic noise which is not perceptible to humans. Increases in pulse width modulated inverter switching frequencies achieved in the last several years (from about 500 Hz to 2 kHz for supplies rated from 1 to 25 kW) have generally been accomplished because of improvements in the speed and ratings of the newer devices. An alternative approach is to modify the switching circuit structure to make best use of the characteristics of available devices.

One well-established approach is the use of snubber networks which protect the devices by diverting switching losses away from the device itself. The most popular snubber configuration is a simple circuit structure in which a small inductor provides turn-on protection while a shunt diode and capacitor across the device provide a polarized turn-off snubber. A resistor connected across the inductor and diode provides a dissipative snubber discharge path. Although the advantages of the use of snubbers in transistor inverters are well-known, packaging problems and the cost of the additional snubber components has made their commercial use infrequent. For GTO inverters, on the other hand, the snubber is absolutely essential for device protection and is often crucial for reliable and successful inverter design. While snubbers adequately alleviate device switching losses, the total switching losses do not change appreciably when losses in the snubber are considered, and can actually increase from the losses experienced in circuits unprotected by snubbers under certain operating conditions. Thus, the increases in inverter switching frequency which have been obtained with the use of snubbers carry a serious penalty in terms of overall system efficiency.

Another alternative is a resonant mode converter employing a high frequency resonant circuit in the power transfer path. Two distinct categories of resonant inverters can be identified. The first category, of which induction heating inverters and DC/DC converters are examples, accomplish control of the power transfer through a modulation of the inverter switching frequency. For these circuits, the frequency sensitive impedance of the resonant tank is the key to obtaining a variable output. While it is also possible to synthesize low frequency AC waveforms using such frequency modulation principles, complexity of control, the large number of switching devices required, and the relatively large size of the resonant components limits the applications for such circuit structures.

The second type of resonant converter, sometimes referred to as a high frequency link converter, typically uses naturally commutated converters and cycloconverters with a high frequency AC link formed of a resonant LC tank circuit. The high frequency link converters are capable of AC/AC or DC/AC conversion with bi-directional power flow and adjustability of the power factor presented to the AC supply. In contrast to the frequency modulation scheme of the first category of converters, the link frequency is not particularly important and output AC waveform synthesis is done through modulation of the output stage. For naturally commutated switching devices, phase angle control is ordinarily used. The high frequency link converter is generally capable of switching at frequencies greater than 18 kHz using available devices at the multi-kilowatt power level. However, the technology has not been economically competitive and has not been widely used industrially for variable speed drive type applications. This may be attributed to several factors. In particular, the large number of bi-directional high speed, high power switches required must be realized using available uni-directional devices. For example, as many as thirty-six thyristors may be required in addition to an excitation inverter in some configurations. The recovery characteristics of the devices used often necessitate the addition of snubber networks, lowering the efficiency of the overall system. In addition, the LC resonant circuit handles the full load power which is transferred from input to output and has large circulating currents, e.g., often up to six times the load current. Consequently, even though the total energy stored in the system is small, the volt-ampere rating of the resonant elements is quite high. Furthermore, control of such systems is extremely complex given the simultaneous tasks of input and output control, high frequency bus regulation, and thyristor commutation for circuits employing naturally commutated thyristors.

SUMMARY OF THE INVENTION

The static power converter of the present invention combines the advantages of DC link systems, which allow the use of a minimum number of devices, and of resonant converters which operate at high switching frequencies. These combined advantages are achieved by providing a switching environment which ensures essentially zero switching losses so that the converter switching frequency is restricted only by device turn-on, storage and turn-off times. Zero switching losses are obtained by holding the DC bus voltage at substantially zero volts for the duration of the switching transient by making the DC bus oscillatory, so that the voltage across the bus remains substantially at zero for a sufficient period of time to allow the loss-less switching to take place. Power may be converted from a direct current supply to a desired AC frequency with the switching of all devices taking place at relatively high frequencies, preferably above 18 kHz to be beyond the human audible range, and generally substantially higher than the output power frequency. The DC supply may itself be a converter connected to AC mains and having switching devices for rectifying the AC power to DC power at the DC bus, with switching of the devices in the DC supply converter also preferably taking place at the times of zero voltage across the DC bus, allowing bi-directional transfer of power. In this manner, the losses incurred in the switching devices may be absolutely minimized and the requirements for snubber networks about the switching devices may be simplified and, in many cases, the need for snubbers may be eliminated.

A power conversion system in accordance with the invention utilizes a resonant circuit formed of an inductor and a capacitor which is induced to oscillate in a stable manner at or below the resonant frequency of the resonant circuit. The resonant circuit is connected to the DC bus from the DC supply in such a manner that the voltage across the DC bus goes essentially to zero volts at least once during each cycle of oscillation of the resonant circuit. A unidirectional average voltage is maintained on the DC bus despite the periodic oscillations of the voltage on the bus. An inverter is connected to receive the voltage on the DC bus and has gate turn-off switching devices which are switched only when the voltage on the DC bus is substantially at zero volts. Various control schemes may be utilized for controlling the inverter delivering power to the AC load, including integral pulse width modulation with the switching signals from the controller being synchronized to coincide with the points of the zero voltage on the DC bus. The power converter of the present invention thus requires only the addition of a small inductor and capacitor to the components required for a conventional voltage source inverter circuit, and is capable of switching almost an order of magnitude faster than state of the art voltage source inverters at significantly improved efficiencies using the same families of devices. It is especially suitable for high power applications using GTOs or other gate turn-off devices.

The converter structure has several operating characteristics which are of particular usefulness in an indusirial environment. The converter has a dead beat response which allows excellent control of transient stresses and minimizes the impact of most load or supply side faults. The circuit has a simple power structure with low losses and requires no snubbers. System reliability is improved over conventional voltage source inverters because the devices have no switching losses. The high switching speed makes it possible to provide very high bandwidth current regulators, and the acoustic noise associated with variable speed drives, often a problem in industrial and commercial installations, is also dramatically reduced. The resonant DC link power converter can also be readily adapted to multi-quadrant, three-phase AC to three-phase AC power conversion with low harmonic currents on both the input and output sides and with substantially unity power factor.

Further objects, features, and advantages of the invention will be apparent from the following detailed desoription when taken in conjunction with the accompanying drawings.

DESCRIPTION OF THE PREFERRED EMBODIMENT

Figure 1:
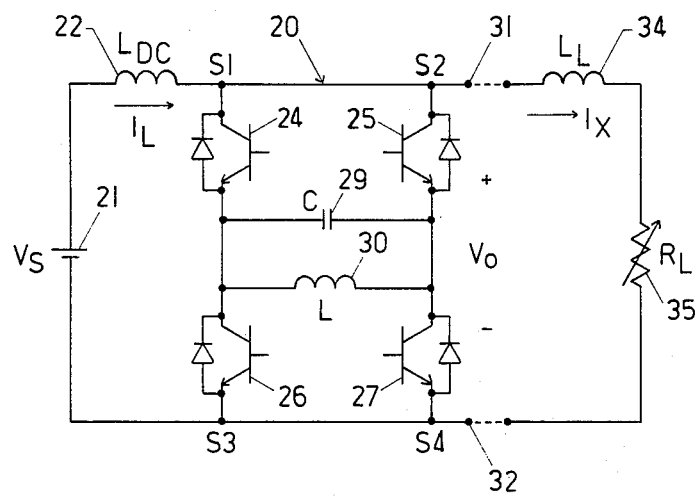
FIG. 1 is a schematic circuit diagram of a current fed resonant converter using an H-bridge with the DC bus structured to form a resonant DC link.

To illustrate the principles of the present invention, a current fed resonant circuit 20 is shown in FIG. 1 which can be controlled to function as a DC resonant link. The circuit 20 includes a direct current (DC) voltage source power supply 21, a series DC link inductor 22 (of inductance $L_{DC}$), and an H-bridge excitation circuit composed of switching transistors 24, 25, 26 and 27, each having associated anti-parallel diodes, with a parallel connected capacitor 29 and inductor 30 across the bridge. The transistors 24, 25, 26 and 27 can be provided with appropriate gating signals to excite the resonant circuit composed of the capacitor 29 and inductor 30 at or below its resonant frequency to produce a substantially sinusoidal oscillating voltage across the parallel combination of the capacitor 29 and inductor 30, resulting in a DC voltage with a superimposed oscillating voltage between DC bus output terminals 31 and 32. For purposes of illustration, the output terminals 31 and 32 may be connected to a load illustratively consisting of an inductance 34 (of inductance $L_L$) and resistance 35 (of resistance $R_L$).

Figure 3:
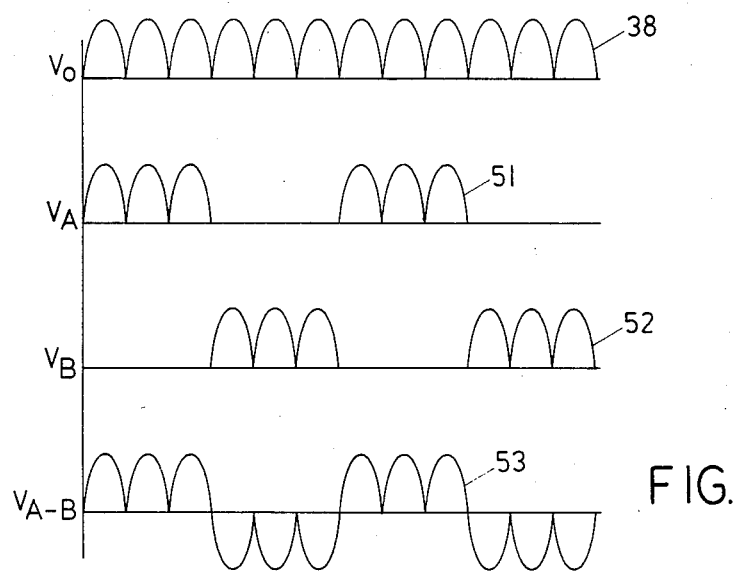
FIG. 3 are graphs illustrating the voltage waveforms in the circuit of FIG. 2 wherein a low frequency AC waveform is synthesized from integral pulses of the resonant DC link using integral pulse-width modulation.

With the load inductance 34 and resistance 35 connected to the terminals 31 and 32, an average current level will exist in the DC link inductor 22 corresponding to the current in the resistor 35 and any current passing through parasitic resistances associated with the H-bridge and the resonant circuit. To maintain the oscillations, the transistor switches 24–27 are switched at points in time at which there is substantially zero voltage across them. This results in a zero switching loss condition, which holds even for switching frequencies below the natural resonant frequency of the resonant circuit. The DC bus voltage $V_O$ is a rectified sinusoid which goes through two zero crossings per cycle of the switching frequency, as illustrated by the graph 38 of FIG. 3 When DC power is delivered to the load inductor 34 and load resistor 35, the resonant circuit damping remains independent of the power delivered, as long as the load inductor 34 is much larger than the DC link inductor 22, and which in turn is larger than the resonant circuit inductor 30. Consequently, even when power is delivered to the load, the resonant circuit composed of the inductor 29 and the capacitor 30 continues to oscillate and does not transfer any of the power which is delivered to the load resistor 35 in the steady state.

Of particular significance is the recognition that because the output voltage $V_O$ at the terminals of the DC bus reaches zero volts, then additional switching devices connected across the bus can also be operated with zero switching losses if they are switched at the zero voltage crossings of the bus. An example is the DC to three-phase converter circuit shown in FIG. 2 in which the DC resonant link 20 is connected to a three-phase inverter 40 composed of paired switching devices (e.g., bipolar transistors with antiparallel diodes) 41 and 42, 43 and 44, and 45 and 46, each connected across the DC bus terminals 31 and 32. AC terminal lines 48, 49 and 50 with associated inductive load impedances are each connected between a respective one of the pairs of switching transistors in the inverter 40. Such a circuit structure allows a low frequency AC waveform to be readily synthesized using integral cycles of the resonant DC link voltage waveform 38, in the manner illustrated in FIG. 3. An integral number of cycles of the rectified DC voltage 38 at the bus terminals 31 and 32 are supplied in sequential fashion to the terminals 48 and 49, yielding the output voltages $V_a$ and $V_b$, shown by the waveform graphs 51 and 52, respectively, and the difference of the voltages at the two terminals may be obtained to yield the waveform 53 composed of $V_a - V_b$.

Figure 2:
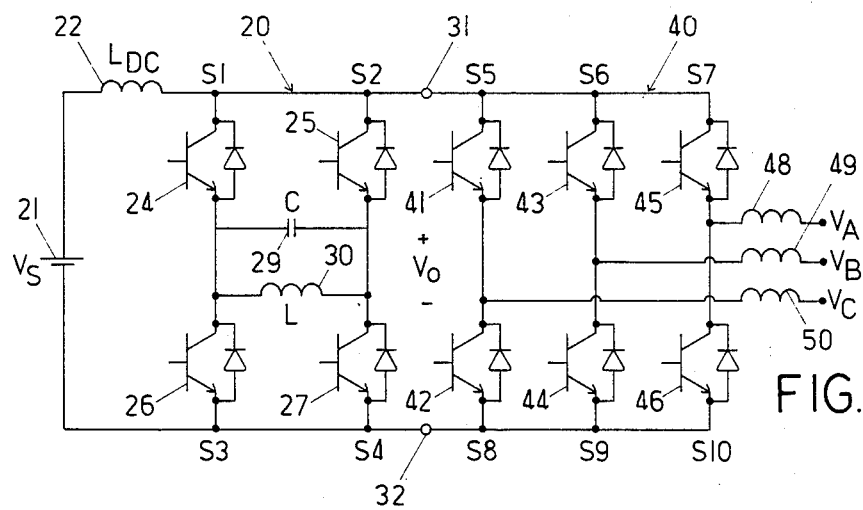
FIG. 2 is a DC to three-phase AC resonant DC link inverter using an H-bridge to drive oscillations in the resonant circuit.

This circuit structure may be readily extended to a three-phase AC to three-phase AC converter by utilizing a conventional three-phase rectifying converter (not shown) connected to three-phase AC mains as the DC voltage supply 21. The operation of this type of voltage source is described further below with respect to the circuit of FIG. 7. The rectifying devices in the AC to DC converter are preferably gated switching devices which may also now be switched on the zero voltage crossings of the DC bus voltage, eliminating switching losses in the entire system. Such a circuit is completely symmetric and may thus be made fully regenerative, allowing transfer of power back and forth between the AC sides, with zero switching losses and low energy storage, and without the need for snubbers. Such a configuration is insensitive to diode recovery time and variations in device storage or turn-off times. During the switching transients, the DC bus voltage automatically continues at zero until the last device has recovered its blocking characteristic.

Where pulse width modulation is used with the inverter of the circuit shown in FIG. 2, very rapid changes in the DC link current drawn by the inverter may occur. This DC current ripple can excite the resonant tank circuit composed of capacitor 29 and inductor 30 and can result in an undesirable modulation of the DC bus voltage. To meet these peak current conditions, the inductor and capacitor of the resonant circuit and the switching devices of the H-bridge should be selected appropriately to handle the stresses imposed.

Figure 4:
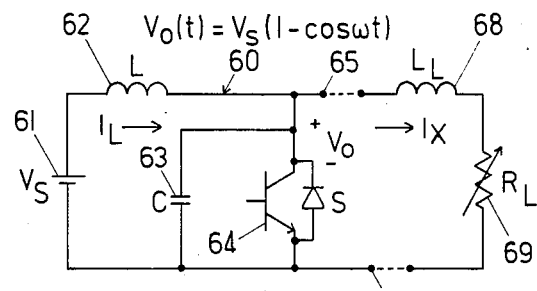
FIG. 4 is a schematic circuit diagram illustrating the formation of a DC resonant link utilizing a single transistor.

An alternative DC resonant link configuration 60 in accordance with the invention is shown in FIG. 4 and includes a DC voltage power supply 61, a series DC resonant link inductor 62 (of inductance L), a capacitor 63 (of capacitance C), and a gated switching device 64 connected across the DC bus terminals 65 and 66 of the resonant link. The inductor 62 and capacitor 63 are connected together to form a resonant tank circuit. For illustration, the terminals of the DC link bus 65 and 66 are connected to a load which includes a load inductor 68 and load resistor 69. To illustrate the operation of the circuit 60, assume that the power supply 61 is initially disconnected from the circuit. If the voltage $V_s$ from the power supply 61 is now applied to the system with the switch 64 off (open circuited), for a loss-less inductor 62 and capacitor 63, the output voltage $V_o$ (with the terminals 65 and 66 disconnected from the load) will vary between $V_s$ and zero and have an average value of one-half $V_s$, with the output voltage varying at the resonant frequency of the LC resonant circuit composed of the inductor 62 and capacitor 63. Every cycle, the output voltage $V_o$ will return to zero volts, thus setting up the desired condition where loss-less switching may take place. For practical LC circuits having finite Q factors, the output voltage $V_O$ will never return to zero and will finally stabilize at $V_s$. However, if the switch 64 is maintained on (conducting) while applying the voltage $V_s$ from the power supply 61, the current in the inductor 62 increases linearly. The switch 64 may then be turned off when sufficient energy is stored in the inductor to ensure that the output voltage $V_O$ will return to zero. At that point the switch 64 may be turned on once again to repeat the process and establish a stable oscillation of the resonant circuit, thereby forming a stable DC resonant link voltage at the DC bus terminals 65 and 66. There will be sufficient current in the inductor 62 to bring the voltage across the capacitor 63 to zero when (with reference to FIG. 4) the current difference $I_L - I_X$ is greater than a quantity $I_{min}$, where $I_{min} = KV_s/Z_O$, K is a selected constant determined to account for parasitic losses, and $Z_O$ is the characterstic impedance of the tank circuit: $(L/C)^{\frac{1}{2}}$.

Figure 5:
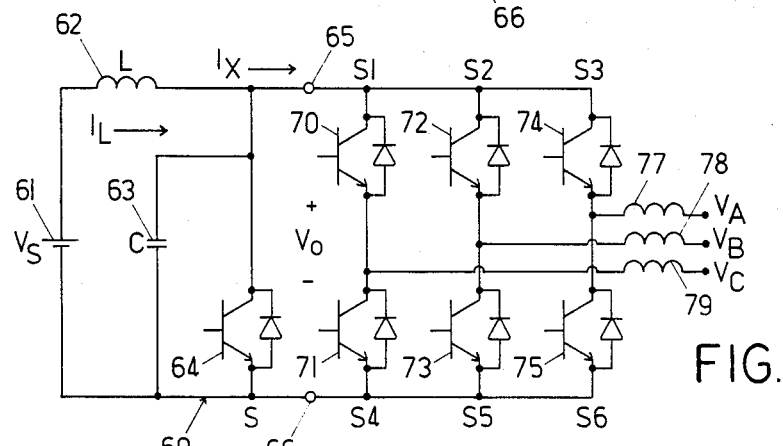
FIG. 5 is a schematic circuit diagram for a DC to three-phase inverter using the DC resonant link of FIG. 4.
Figure 8:
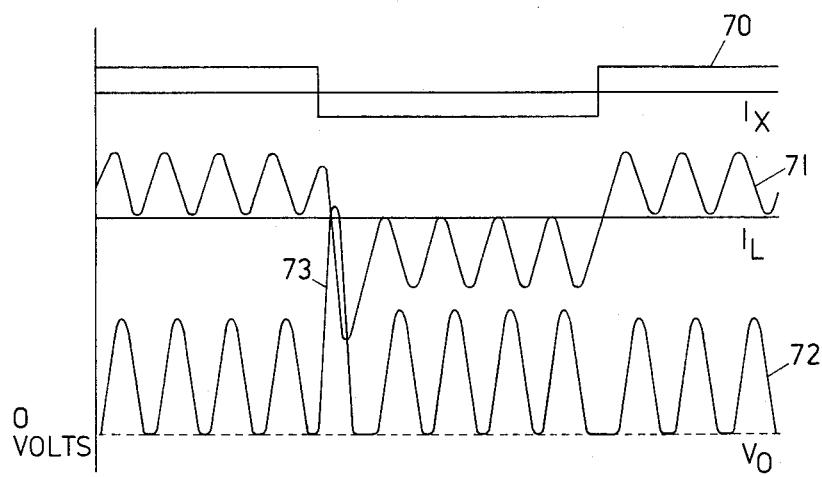
FIG. 8 are graphs illustrating currents and voltages in a DC resonant link circuit equivalent to that of FIG. 4.

The response of the circuit of FIG. 4 to load current demands $I_X$ is illustrated in FIG. 5. For a load current $I_X$ which has a square waveform as illustrated by the graph 70, imposing sharp changes in current demand on the DC resonant link, the resulting inductor current $I_L$ as the switching of the load current occurs is illustrated by the graph 71, and the resonant link output voltage $V_O$ during the switching periods is illustrated by the graph 71. The transition of the load current $I_X$ illustrated in FIG. 8 is analogous to the transition seen in driving a motor from the motoring to the regenerating mode and back again. During the first transition from motoring to regenerating, a large overshoot 73 is observed in the output voltage $V_O$ for one resonant cycle. In the second transition from regenerating to motoring, very little change in either resonant link current or voltage occurs, a desirable deadbeat characteristic. The voltage overshoot 73 may be easily contained by utilizing a voltage clamping type energy recovery circuit without affecting the transient performance of the system.

The resonant link circuit of FIG. 4 can readily be extended to provide an AC output by connecting an inverter to the DC bus terminals 65 and 66, as illustrated in FIG. 5. The inverter is composed of pairs of gate turn-off switching devices (e.g., bipolar transistors) 70 and 71, 72 and 73, and 74 and 75, having output lines 77, 78 and 79 on which voltages $V_A$, $V_B$ and $V_C$ are provided. Again, as described above with respect to the circuit of FIG. 2, a control strategy similar to pulse width modulation with discrete switching instants allowed may be utilized to provide the AC output waveforms on the line 77-79 with each of the switching devices 70-75 synchronized to switch at the points in time at which the voltage across the DC bus terminals 65 and 66 goes to zero. Proper control of the switching of the devices 64 and 70-75 requires that the current difference $I_L - I_X$ be monitored to determine when sufficient excess energy is stored in the inductor 62 to ensure that the voltage $V_O$ across the terminal 65 and 66 can be returned to zero.

Figure 6:
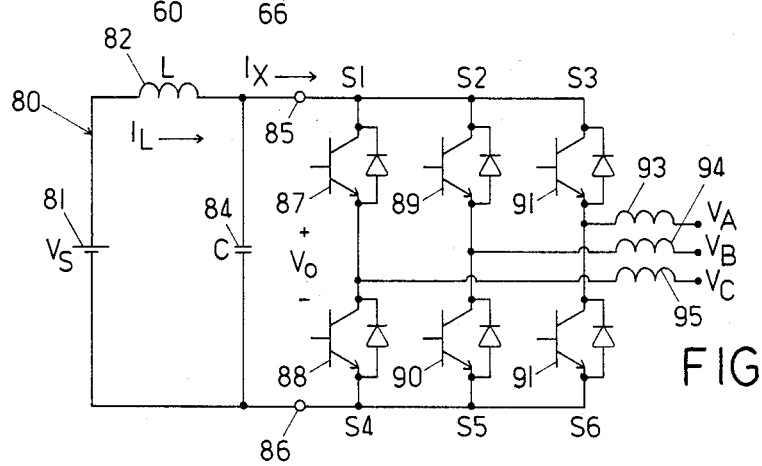
FIG. 6 is a schematic circuit diagram of a DC to three-phase inverter in which excitation of the resonant circuit is obtained utilizing the switching transistors of the inverter.

It may be noted from a review of the circuit structure of FIG. 5 that the switching device 64 is connected in parallel across the DC bus terminals 65 and 66 with any of the per phase pairs of switching devices 70-75. Thus, the switching device 64 is essentially redundant and its function may be performed by any one of the pairs of per phase switching devices. A power converter circuit 80 which performs DC to three-phase AC conversion in this manner is illustrated in FIG. 6. This circuit has a power source 81 of direct current voltage $V_s$, a series inductor 82 of inductance L, and a capacitor 84 of capacitance C connected across the DC bus terminals 85 and 86 which forms a resonant circuit with the inductor 82. An inverter is connected to the DC bus terminals 85 and 86 and is composed of per phase pairs of switching devices (e.g., bipolar transistors) 87 and 88, 89 and 90, and 91 and 92, having output lines 93, 94 and 95, which should have associated load inductances, on which appear voltages $V_A$, $V_B$ and $V_C$. Again, switching of the inverter devices 87-92 is accomplished in the manner described above to provide modulation of the inverter stage, with the additional requirement that one of the per phase pairs of switching devices is periodically closed together to short across the capacitor 84 and provide the required charging current to the inductor 82 to maintain oscillations in the LC resonant circuit composed of the inductor 82 and capacitor 84.

Figure 7:
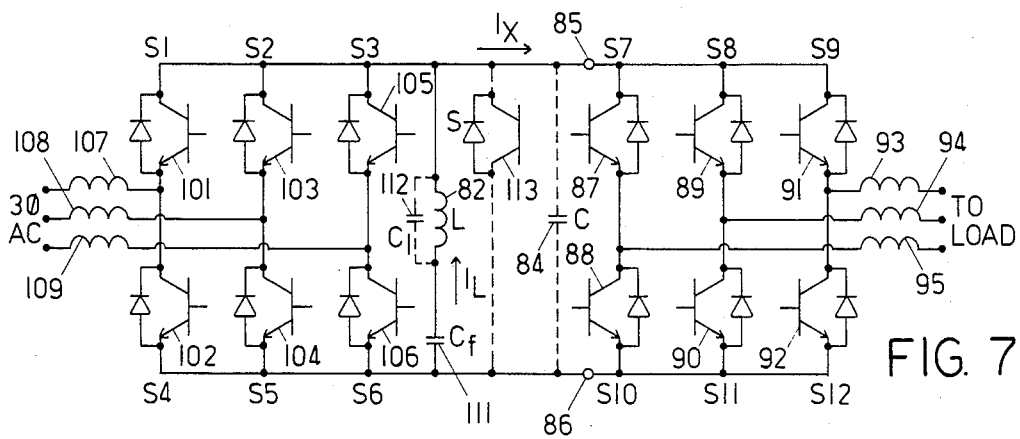
FIG. 7 is a three-phase AC to three-phase AC power converter utilizing a DC resonant link.

A three-phase AC to three-phase AC power conversion system may readily be derived from the basic circuits of FIG. 5 or FIG. 6. FIG. 7 illustrates such an AC to AC inverter utilizing the system of FIG. 6 and having a controllable rectifying converter formed of pairs of gate controlled switching devices (e.g., bipolar transistors) 101 and 102, 103 and 104, and 105 and 106, receiving input AC power on input lines 107, 108 and 109 which each include a series inductance, for example the leakage inductance of the supply transformer. The inductances in the input lines 107, 108 and 109 allow the rectifying converter to provide substantially constant current output to the resonant tank circuit and DC bus during a resonant cycle of the DC bus voltage. To provide a substantially constant average DC voltage at the DC bus terminals 85 and 86, a relatively large electrolytic filter capacitor 111 (of capacitance $C_f$) is connected in series with the inductor 82, and both are connected between the terminals 85 and 86. The filter capacitor 111 functions as a DC voltage source having an average voltage $V_s$. The capacitor 111 is charged by the uni-directional pulses from the converter composed of the switching devices 101 to 106, passed through the inductor 82. As an alternative to the capacitor 84, a capacitor 112 may be connected across the inductor 82 to form a resonant circuit with the inductor 82. The circuit of FIG. 7 is adapted to drive oscillations in the resonant tank circuit composed of the inductor 82 and capacitor 84 (or capacitor 112) by selectively turning on one of the per phase pairs of inverter switching devices 87-92 to provide a shunt across the DC bus terminals 86, thereby allowing the capacitor 111 to discharge through the inductor 82 to build up a current in the inductor sufficient to cause the voltage across the capacitor 84, and thus the voltage at the output bus terminals 85 and 86, to go to zero during each cycle. Alternatively, a separate switching device 113 may be connected across the DC bus terminals 85 and 86 to accomplish this function in the manner of the DC link circuit 60 of FIG. 5. By switching all of the gate controlled switching devices at the points of zero voltage across the DC bus terminals 85 and 86, substantially no switching losses occur. The circuit is seen to be completely sYmmetric and fully regenerative, allowing transfer of power in either direction between the input terminals 107-109 and the load terminals 93-95. Several significant advantages characterize this circuit structure. By adding one small inductor and a small capacitor to a conventional voltage source inverter, which would ordinarily include an electrolytic filter capacitor such as the capacitor 111 on the output of the rectifying converter, switching losses are substantially eliminated and it is possible to greatly increase the inverter efficiency and the switching frequency. Active control of the current $I_L - I_X$ ensures that each resonant cycle starts with the same initial conditions. Thus, the resonant cycle is controlled in a deadbeat manner, independent of the actual value of the DC link current, $I_X$. Consequently, there is substantially no sustained DC bus modulation and the required sizes of the resonant elements are small.

It should be understood that the resonant circuit configurations illustrated in FIGS. 1, 2, and 4–7 are only illustrative, and many other equivalent configurations will be apparent. For example, in the circuits of FIGS. 5 and 6, the capacitors 63 and 84 may be moved and connected in parallel with the inductors 62 and 82, respectively. In the circuit of FIG. 7, the capacitor 84 may be split and equivalent capacitances connected across the individual gate turn off devices 87–92.

Because of the substantial elimination of switching losses, power converters in accordance with the present invention are substantially more efficient than conventional converters. For example, a typical conventional pulse width modulated converter operating at a DC supply voltage of 150 volts, providing 30 amperes at a switching frequency of 20 kHz (4.5 kW rating), using switching transistors having a rise time of 1 microsecond and a fall time of 2 microseconds, and having a snubber capacitor of a size of 0.2 microfarads with associated inductance of 5 microhenrys, has a total power dissipation in switching losses of 630 watts and an efficiency of 87 percent. Utilizing the H-bridge resonant inverter of the form shown in FIG. 2, having the same transistor switches and a resonant capacitor of 3.2 microfarads and resonant inductor of 19.8 microhenrys, the total power dissipation is 330 watts and the efficiency is 93.1 percent. For a single transistor DC link inverter of the type shown in FIG. 5, having the same transistor switches and a resonant capacitor of 0.75 microfarads and an inductor of 85 microhenrys, the power dissipated in the LC resonant circuit is 133 watts, for an efficiency of 97.1 percent. The only significant constraint on device operating characteristics is that the switching devices be capable of handling peak voltages of at least twice the DC supply voltage which are imposed on the device during switching transients. Because the switching losses are essentially zero, greater conduction losses are permitted, allowing the switching devices to be used at their optimum thermal ratings. The greater current that can thus be drawn through the devices substantially compensates for the greater voltage ratings required to withstand the increased switching transient voltages. Of course, the switching devices may be switched at DC bus voltages which are substantially zero, i.e., a few volts above zero as long as excessive transient currents are not imposed on the device. The switching losses will commensurately increase, and efficiency will decrease, as switching is done further from the ideal condition of zero voltage. Furthermore, as illustrated in the waveform of FIG. 8, once the DC bus voltage reaches zero and switching occurs, the voltage on the DC bus remains at zero until all switching of devices is completed. Various devices are available which can be utilized, including bipolar junction transistor, gate turn off thyristors, power field effect transistors, etc.

From the discussion above, it is apparent that various means are available for maintaining stable oscillations of the LC resonant circuit such that the voltage across the DC bus terminals returns to zero. These include the H-bridge of FIG. 2, the single transistor switch of FIG. 5, and the system of FIG. 6 in which the function of the switch of FIG. 5 is carried out by pairs of the switching devices in the inverter. With reference to the circuit of FIG. 5, the control sequence can be illustrated for both the single switch case and the case in which the switch is incorporated in the inverter. Initially, the single switch 64 or one of the switch combinations 70–71, 72–73, or 74–75 is kept on while the voltage $V_s$ from the source 61 is applied. With the DC bus terminals 65 and 66 short circuited, the voltage across the terminals equals zero and the inductor current $I_L$ increases linearly with time. The current difference $(I_L - I_X)$ is monitored (for the circuit of FIG. 5 wherein the single switch 64 is used) to determine when the current available for charging the capacitor increases above the minimum calculated value $I_{min}$ which will ensure that the capacitor can be discharged sufficiently to bring the voltage across the DC bus terminals to zero. Where pairs of switches are used to short the DC bus, the current in the other switch pairs must be accounted for to determine the current available for charging the capacitor. When the current $I_{min}$ is reached, the switch 64 (or one of the equivalent pairs of per phase devices) is turned off (at a point of zero DC bus voltage) to start the resonant cycle. The appropriate switches 70–75 are also turned on in the proper sequence as desired to provide the output voltages on the terminals 77–79 and the voltage $V_O$ between the DC bus terminals now goes above zero. When the voltage $V_O$ across the bus terminals returns to zero volts, the switch 64 (or equivalent pairs of switches in the inverters) can now be turned on and any or all of the switches 70–75 (as desired) can now also be switched according to control signals from a control modulator. One control modulator implementation that may be used is the delta modulator shown in FIG. 11, which compares a desired reference signal for each phase with the integral pulse width modulated output and provides the error signal to an integrator 115 and comparator 116. The switching of the inverter devices 70–75 is synchronized to the switching of the oscillator switch 64 which is itself synchronized with the points in time at which the bus voltage $V_O$ across the terminals 65 and 66 reaches zero by passing the output of the comparator 116 to a flip-flop 117 which is clocked by a signal which provides pulses when the DC bus voltage substantially reaches zero.

Figure 11:
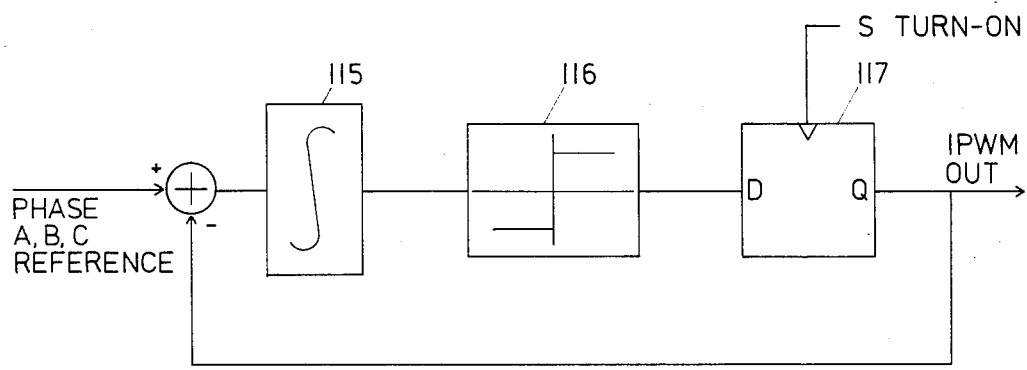
FIG. 11 is a block diagram of an integral pulse width modulator which may be utilized in the controller of FIG. 9.
Figure 9:
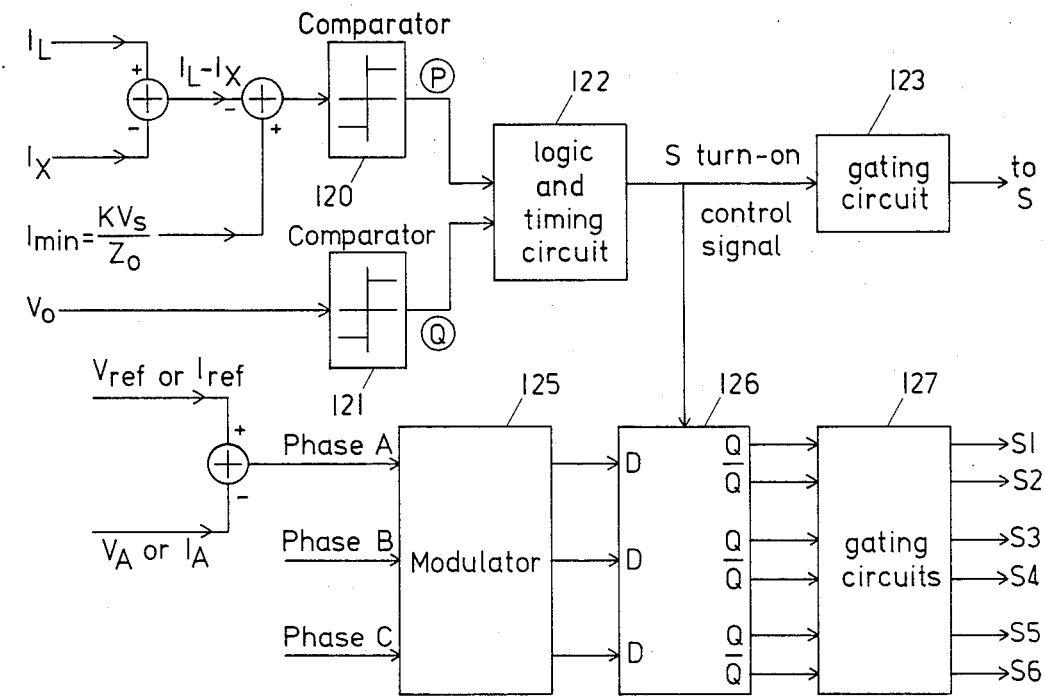
FIG. 9 is a block diagram of a controller for controlling the oscillation of the resonant circuit and the modulation switching of the switching devices in the inverter for a circuit of the type shown in FIG. 5.

A control system for controlling the switching of the single oscillator transistor 64 and the inverter transistor 70–75 which incorporates the modulator structure of FIG. 11 is shown in FIG. 9. The inductor current $I_L$, the load current $I_X$, the voltage $V_O$ across the terminals 65 and 66 of the DC bus, and the phase voltages or currents are monitored. The difference between the inductor current $I_L$ and the load current $I_X$ is subtracted from a calculated minimum current $I_{min}$ required to maintain oscillations. The differences are provided to a comparator 120 which switches outputs when the difference is negative. The voltage across the DC bus, $V_O$, is provided to a comparator 121 which switches when the bus voltage reaches zero. The outputs of the comparators 120 and 121 are provided to a logic and timing circuit 122 which uses these signals to provide an output enable or turn-on signal which allows turn-on of the various switches when the conditions from both comparators are satisfied. The turn-on signal from the circuit 122 is provided to a gating circuit 123 which provides the proper gate driving signals to the switch 64 so that this switch may be turned on until the comparator 120 changes condition. This then ensures excitation of the LC resonant circuit composed of the inductor 62 and capacitor 63 sufficient to maintain oscillation. The inverter is controlled in a conventional manner with either a voltage reference or a current reference being compared with each phase voltage or current and provided to a modulator 125 which may be implemented as shown in FIG. 11. The modulated output signal is provided to a latch 126 which receives the synchronization signal from the logic circuit 122 to synchronize changes in the output of the latch 126 with the times of zero voltage across the DC bus. The outputs of the latch 126 are provided to gating circuits 127 which provide proper gating drives to the gate inputs of the switching devices 70–75.

Figure 10:
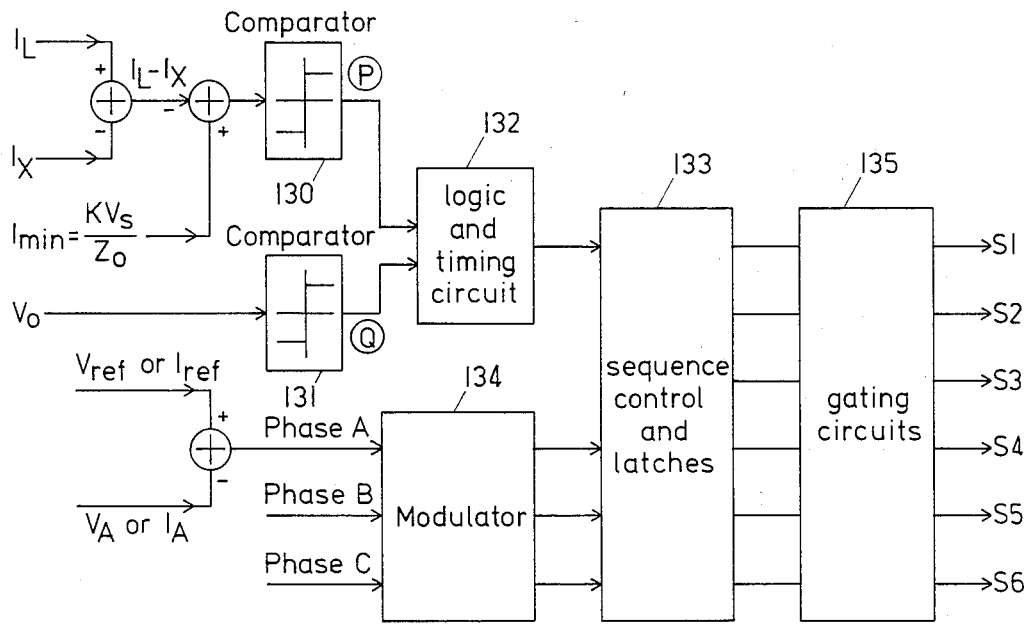
FIG. 10 is a block diagram of a controller for controlling the oscillation of the resonant circuit and the modulation switching of the switching devices in the inverter for a circuit of the type shown in FIG. 6.

For a power converter in which the function of the single switch 64 is performed by a series combination of the devices 70, 71 ($S_1$, $S_4$), 72, 73 ($S_2$, $S_5$), or 74, 75 ($S_3$, $S_6$), as in the circuit of FIG. 7, additional control circuitry is needed to sequence the shorting gate signals to the switches 70–75. A control circuit for performing these control functions is shown in FIG. 10. As before, the difference between the inductor current $I_L$ and the load current $I_X$ (accounting for current in the non-shorting switches) is subtracted from the calculated $I_{min}$ and the overall difference provided to a comparator 130 which switches when the difference goes between positive and negative values. The voltage between the DC bus terminals $V_{bus}$ is also provided to a comparator 131 which switches when the bus voltage reaches zero. The outputs of the comparators 130 and 131 are provided to a logic and timing circuit which provides a synchronization signal to a sequence control and latch circuit 133. The differences between the voltage or current reference and the actual voltage or current for each phase are provided to a modulator 134 of any suitable design, such as the modulator structure of FIG. 11, and the output of the modulator is also provided to the sequence control and latch circuit 133. The output of this circuit is provided to gating circuits 135 which provide the proper gating signals to the switches 70–75 to fire them either in sequence to short out the capacitor or to provide the output voltages on the phases. For a circuit of the type shown in FIG. 7, in which pairs of gated devices are utilized for the input conversion of the AC input power to the DC level, the per phase pairs of rectifying converter switches 101–106 may alternatively be turned on in pairs to short out the capacitor 84. In either case, proper system operation requires that the power supplied to the load, plus the losses in the conversion system, must equal the power input from the power system lines. A reasonable control strategy minimizes harmonics on both the AC power line and load sides and operates with unity power factor on the AC power supply side. It is preferred that the controllers operate so as to minimize the difference between the instantaneous input power and the instantaneous sum of output power plus losses, such that the system has a minimum energy storage requirement and requires only a relatively small filter capacitor 111.

Utilizing a control scheme of this type, with switching in the DC link at a resonant frequency of approximately 18 kHz or higher, a significant reduction in the audible noise generated by the inverter-motor system as compared with conventional pulse width modulated systems is noted. This improvement is partly due to the non-stationary characteristics of the output signal due to non-synchronous references and bus oscillation frequencies. No dominant spectral harmonic components are observed in the inverter line to line voltage in the audible frequency range under normal operating conditions. The motor-inverter combination of the present invention produces only a relatively low level hissing sound rather than the extremely loud whine associated with conventional PWM systems. It is believed that the lower noise levels may be due also in part to the fact that the change in voltages with respect to time experienced by the motor windings is much less severe in the present motor-inverter system than in conventional PWM systems.

In addition to the obvious efficiency advantages of the present conversion system, which has substantially no switching losses, by eliminating switching losses it is also possible to significantly reduce the size and expense of the heat sinks required for the switching transistors or alternatively to increase the conduction losses permissible in a given device, thus raising its useful current carrying capacity at a given frequency.

It is understood that the invention is not limited by the particular embodiments disclosed herein, but embraces such modified forms thereof as come within the scope of the following claims.

What is claimed is:

1. A power converter for converting DC power to AC power comprising:
   (a) a resonant circuit having an inductor adapted to receive a DC power input, a capacitor connected to the inductor, and a DC bus providing the output voltage from the resonant circuit;
   (b) means for causing the resonant circuit to oscillate stably at or below its resonant frequency and for the voltage across the DC bus to be maintained at an average DC level and to go to zero voltage at least once during each cycle of oscillation of the resonant circuit; and
   (c) an inverter connected to receive the voltage on the DC bus and having gated switching devices which are switched on and off only when the voltage on the DC bus is substantially zero.

2. The power converter of claim 1 wherein the means for causing the resonant circuit to oscillate includes a switching device connected across the DC bus and switched at times of zero voltage on the DC bus to develop a current in the inductor sufficient to allow the capacitor to be driven to zero voltage during the oscillation cycle.

3. The power converter of claim 1 wherein the means for causing the resonant circuit to oscillate includes pairs of switching devices in the inverter which are controlled to switch together to shunt the capacitor to develop a current in the inductor sufficient to allow the voltage in the capacitor to be driven to zero during the oscillation cycle.

4. The power converter of claim 1 wherein the inverter includes series connected pairs of gate turn-off switching devices connected across the DC bus, each gate turn-off device turned off and on only at times of substantially zero DC bus voltage in a manner such that the voltages between the pairs of gate turn-off devices varies cyclically as a function of time at a desired frequency which is substantially less than the frequency of oscillation of the resonant circuit.

5. The power converter of claim 4 wherein the means for causing the resonant circuit to oscillate turns on selected pairs of the gate turn-off devices in the inverter together to provide a shunt across the capacitor of the resonant circuit to develop sufficient current in the inductor of the resonant circuit to allow the capacitor voltage to be driven to zero during the oscillation cycle.

6. A method of maintaining stable oscillations in a resonant circuit composed of an inductor receiving uni-directional power and a capacitor connected to the inductor, wherein the resonant circuit is connected to an inverter having gate turn off switching devices such that the output voltage from the resonant circuit is provided to the inverter, comprising the steps of:
(a) shunting the current from the inductor around the capacitor and then opening the shunt to allow the current from the inductor to flow into the capacitor and into the inverter, the capacitor being shunted for a period of time sufficient to build up sufficient current in the inductor such that, when the shunt is removed, the voltage across the capacitor will be driven to zero at the end of one resonant cycle; and
(b) switching the switching devices of the inverter on and off only at times of substantially zero voltage provided from the resonant circuit to the inventor.

7. The method of claim 6 wherein the shunt is applied to and removed from the capacitor only at times of substantially zero voltage across the capacitor.

8. A power converter comprising:
(a) power supply means for providing DC output power;
(b) a resonant circuit having an inductor and a capacitor connected together to receive the DC power from the power supply means and to provide direct current voltage to a DC bus;
(c) means for causing the resonant circuit to oscillate stably at or below its resonant frequency such that the voltage on the DC bus goes to zero at least once during each cycle of oscillation of the resonant circuit; and
(d) an inverter connected to receive the voltage on the DC bus and having gated switching devices which are switched on and off only when the voltage provided on the DC bus is substantially zero.

9. The power converter of claim 8 wherein the means for causing the resonant circuit to oscillate includes a switching device connected across the DC bus and controlled to switch at times of zero voltage across the DC bus to develop sufficient current in the inductor to maintain steady oscillations in the resonant circuit with the voltage across the capacitor of the resonant circuit going to zero voltage at least once during each cycle of oscillation.

10. The power converter of claim 8 wherein the means for causing the resonant circuit to oscillate includes series connected pairs of switching devices connected across the DC bus which are switched at times of zero voltage on the DC bus to develop sufficient current in the inductor to maintain stable oscillations in the resonant circuit with the voltage across the capacitor of the resonant circuit going to zero during each cycle of oscillation.

11. The power converter of claim 8 wherein the inverter includes pairs of gate turn-off switching devices connected across the DC bus, each gate turn-off device turned off and on only at times of substantially zero DC bus voltage in a manner such that the voltages between pairs of gate turn-off devices vary cyclically as a function of time at a desired frequency.

12. The power converter of claim 11 wherein the means for causing the resonant circuit to oscillate includes means for turning on selected pairs of the gate turn-off devices in the inverter together to provide a shunt across the DC bus to develop sufficient current in the inductor of the resonant circuit such that stable oscillations of the resonant circuit are maintained with the voltage across the capacitor of the resonant circuit going to zero at least once during each cycle of oscillation.

13. The power converter of claim 8 wherein the power supply means includes pairs of switching devices connected in a bridge configuration to a source of alternating current power and having outputs connected to provide DC power to the resonant circuit, and wherein the switching devices are switched on and off in a sequence such that average power is provided to the resonant circuit to maintain excitation.

14. The power converter of claim 12 wherein the switching devices in the power supply means are switched only at times when the DC bus voltage is substantially at zero.

15. A resonant DC power supply comprising:
(a) a converter including pairs of gate turn off switching devices connected in a bridge configuration to receive AC power from an AC power system and to be switched to rectify the AC power to uni-directional power at an output and including inductance connected between the AC power system input lines and its uni-directional output;
(b) a resonant circuit having an inductor and a capacitor connected together, the resonant circuit connected to the output of the bridge converter switching devices, and an additional power supply capacitor connected in series with the inductor, and including a DC output bus connected to the resonant circuit;
(c) means for causing the resonant circuit to oscillate stably at or below its resonant frequency such that the voltage across the DC output bus goes to zero voltage at least once during each cycle of oscillation and such that a average voltage is maintained across the power supply capacitor and across the DC bus, and wherein the switching devices in the converter are controlled to switch at times of zero voltage across the DC bus.

16. The circuit of claim 15 wherein the means for causing the resonant circuit to oscillate includes a switching device connected across the DC bus and means for controlling the switching of the switching device to switch at times of zero voltage across the DC bus to maintain steady oscillations in the resonant circuit.

17. The circuit of claim 15 wherein the means for causing the resonant circuit to oscillate includes pairs of switching devices connected across the DC bus wich are switched at times of zero voltage across the DC bus to maintain steady oscillations in the resonant circuit.

18. A resonant DC power supply comprising:
(a) a converter including a pairs of switching devices connected in a bridge configuration to receive AC power from an AC power system and to be switched to rectify the AC power to uni-directional power at an output and including inductance connected between the AC power system input lines and its uni-directional output;

(b) a resonant circuit having an inductor and a capacitor connected together, the resonant circuit connected to the output of the bridge converter switching devices and an additional power supply capacitor connected in series with the inductor, and including a DC output bus connected to the resonant circuit;

(c) means for causing the resonant circuit to oscillate stably at or below its resonant frequency such that the voltage across the DC output bus goes to zero voltage at least once during each cycle of oscillation and such that an average voltage is maintained across the power supply capacitor and across the DC bus, wherein the means for causing the resonant circuit to oscillate includes a switching device connected across the DC bus and means for controlling the switching of the switching device to switch at times of zero voltage across the DC bus to maintain steady oscillations in the resonant circuit.

19. A resonant DC power supply comprising:
(a) a converter including pairs of switching devices connected in a bridge configuration to receive AC power from an AC power system and to be switched to rectify the AC power to uni-directional power at an output and including inductance connected between the AC power system input lines and its uni-directional output;
(b) a resonant circuit having an inductor and a capacitor connected together, the resonant circuit connected to the output of the bridge converter switching devices and an additional power supply capacitor connected in series with the inductor, and including a DC output bus connected to the resonant circuit;
(c) means for causing the resonant circuit to oscillate stably at or below its resonant frequency such that the voltage across the DC output bus goes to zero voltage at least once during each cycle of oscillations and such that an average voltage is maintained across the power supply capacitor and across the DC bus, wherein the means for causing the resonant circuit to oscillate includes pairs of switching devices connected across the DC bus to maintain steady oscillations in the resonant circuit.

20. A power converter comprising:
(a) power supply means for receiving AC power at a first frequency and providing DC output power;
(b) a resonant circuit having an inductor and a capacitor connected together to receive the DC power from the power supply means and to provide direct current voltage to a DC bus;
(c) means for causing the resonant circuit to oscillate stably at or below its resonant frequency at a second frequency substantailly higher than the first frequency such that the voltage on the DC bus goes to zero at least once during each cycle of oscillation of the resonant circuit; and
(d) an inverter connected to receive the voltage on the DC bus and having switching devices which are switched only when the voltage provided on the DC bus is substantially zero to provide AC output power at a third frequency which is substantially lower than the second frequency.

21. The power converter of claim 20 wherein the frequency of oscillation of the resonant circuit is at least ten times the frequency of the AC output power from the inverter.

22. The power converter of claim 20 wherein the frequency of oscillation of the resonant circuit is at least about 18,000 Hz.

23. A power converter adapted to convert input power which is at a first frequency, comprising:
(a) means for receiving the input power at a first frequency and for providing a uni-directional output voltage on a DC bus which cyclically reaches zero voltage at a second frequency which is substantially higher than the first frequency, wherein the means receiving power includes a resonant circuit having an inductor and a capacitor connected together, converter means receiving the input power at the first frequency for rectifying the input power and providing the rectified power to the resonant circuit, and further including means for causing the resonant circuit to oscillate stably at the second frequency such that the voltage across the DC bus goes to zero voltage at least once during each cycle of oscillation; and
(b) inverter means, connected to receive the power from the DC bus and having switching devices therein, for converting the DC power from the DC bus to AC power at a third frequency which is substantially lower than the second frequency, the switching devices in the inverter means being switched only when the voltage at the DC bus is substantially at zero volts.

24. The power converter of claim 23 wherein the means for causing the resonant circuit to oscillate includes a controllable switching device connected across the capacitor of the resonant circuit and means for switching the switching device on and off at substantially the points of zero voltage of the capacitor and for shunting the capacitor for a time sufficient to provide a current level in the inductor which will be sufficient to drive the voltage in the capacitor to zero to maintain stable oscillations in the reasonant circuit.

25. The power converter of claim 23 wherein the means for causing the resonant circuit to oscillate includes four controllable switching devices connected to the DC bus in an H-bridge configuration with the inductor and capacitor of the resonant circuit connected across the bridge.

* * * * *

UNITED STATES PATENT AND TRADEMARK OFFICE
CERTIFICATE OF CORRECTION

PATENT NO. : 4,730,242
DATED : March 8, 1988
INVENTOR(S) : Deepakraj M. Divan

It is certified that error appears in the above-identified patent and that said Letters Patent are hereby corrected as shown below:

In the title, after "CONVERSION" and before "AND" insert --METHOD--.

Col. 8, line 62, "sYmmetric" should read --symmetric--.

Col. 14, line 64, after "including" and before "pairs", omit "a".

Col. 16, line 51, "reasonant" should read --resonant--.

Signed and Sealed this

Sixth Day of September, 1988

Attest:

DONALD J. QUIGG

*Attesting Officer*  *Commissioner of Patents and Trademarks*